United States Patent
Hiromatsu

(10) Patent No.: US 8,081,357 B2
(45) Date of Patent: Dec. 20, 2011

(54) IMAGE SCANNING APPARATUS, IMAGE SCANNING METHOD, AND PROGRAM FOR USE IN IMAGE SCANNING APPARATUS

(75) Inventor: Kenji Hiromatsu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 277 days.

(21) Appl. No.: 12/270,674

(22) Filed: Nov. 13, 2008

(65) Prior Publication Data

US 2009/0073519 A1    Mar. 19, 2009

Related U.S. Application Data

(63) Continuation of application No. 10/844,767, filed on May 12, 2004, now Pat. No. 7,460,284.

(30) Foreign Application Priority Data

Jun. 17, 2003    (JP) .................................. 2003-172014

(51) Int. Cl.
*H04N 1/46* (2006.01)
*H04N 1/387* (2006.01)
*G06K 15/00* (2006.01)
*G06T 5/00* (2006.01)

(52) U.S. Cl. ....... 358/505; 358/3.03; 358/3.26; 358/463

(58) Field of Classification Search ................... 358/461, 358/512, 500, 1.9, 3.27, 504, 505, 3.08, 3.03, 358/3.26, 2.1, 1.3, 463
See application file for complete search history.

(56) References Cited

U.S. PATENT DOCUMENTS

| | | | |
|---|---|---|---|
| 6,967,749 B2 * | 11/2005 | Chen | 358/406 |
| 6,980,309 B2 * | 12/2005 | Kanno et al. | 358/1.15 |
| 7,173,740 B2 * | 2/2007 | Kanamori | 358/3.24 |
| 2004/0174568 A1 * | 9/2004 | Murakami | 358/2.1 |
| 2004/0190019 A1 * | 9/2004 | Li et al. | 358/1.9 |
| 2004/0246533 A1 * | 12/2004 | Touura | 358/461 |

* cited by examiner

*Primary Examiner* — Jerome Grant, II

(57) ABSTRACT

A color image-scanning device has a fixed scan mode and a flow scan mode. In the fixed scan mode, a document is scanned while maintaining the document at a fixed location on a platen glass. In the flow scan mode, a document is fed from an automatic document feeder and is scanned while moving the document. In each of these modes, images are scanned in a main scanning direction and a sub scanning direction. Color registration errors in the main and sub scanning direction caused by an optical factor are corrected in accordance with correction values stored in a memory. Respective correction values for each of the main and sub scanning directions are acquired by scanning a test chart in each of the fixed-scan mode and the flow-scan mode and stored in the memory. Proper correction values are read from the memory depending on the scanning mode selected, and color registration errors are corrected in accordance with the read correction value.

14 Claims, 14 Drawing Sheets

FIG. 3
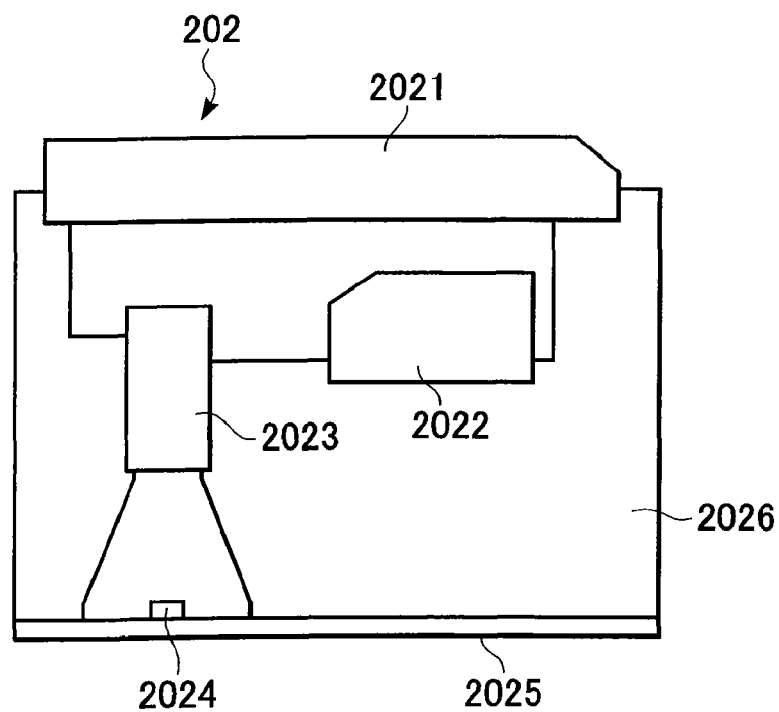
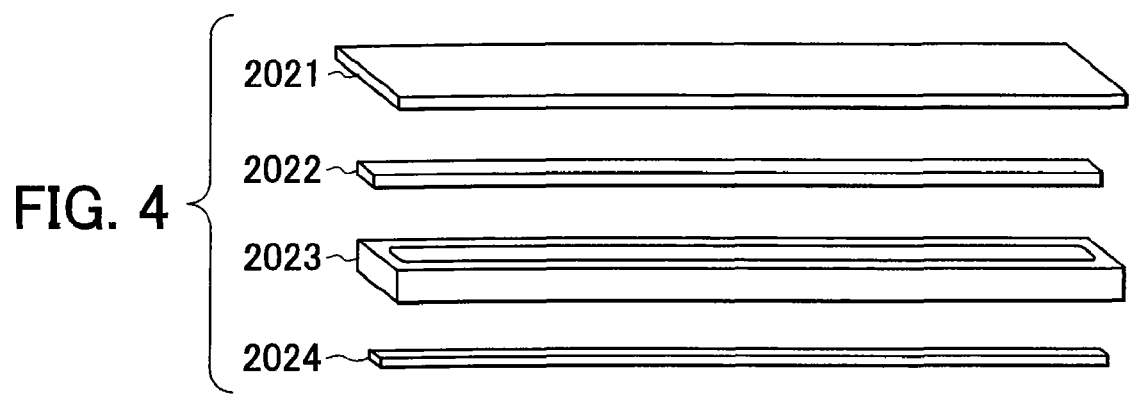
FIG. 4

FIG. 15

| LABEL | REGISTRATION ERROR (IN UNITS OF PIXELS) | DESCRIPTION |
|---|---|---|
| M_RG | +0.40 | R-G IN MAIN SCANNING DIRECTION IN FIXED SCAN MODE |
| M_BG | -0.40 | B-G IN MAIN SCANNING DIRECTION IN FIXED SCAN MODE |
| M_DF_RG | -0.35 | R-G IN MAIN SCANNING DIRECTION IN FLOW SCAN MODE |
| M_DF_BG | +0.35 | B-G IN MAIN SCANNING DIRECTION IN FLOW SCAN MODE |
| S_RG | +0.15 | R-G IN SUB SCANNING DIRECTION IN FIXED SCAN MODE |
| S_BG | -0.15 | B-G IN SUB SCANNING DIRECTION IN FIXED SCAN MODE |
| S_DF_RG | -0.20 | R-G IN SUB SCANNING DIRECTION IN FLOW SCAN MODE |
| S_DF_BG | +0.20 | B-G IN SUB SCANNING DIRECTION IN FLOW SCAN MODE |

IMAGE SCANNING APPARATUS, IMAGE SCANNING METHOD, AND PROGRAM FOR USE IN IMAGE SCANNING APPARATUS

CROSS REFERENCE TO RELATED APPLICATIONS

This application is a Continuation of U.S. patent application Ser. No. 10/844,767 filed May 12, 2004, which claims priority from Japanese Patent Application No. 2003-172014 filed Jun. 17, 2003, both of which are hereby incorporated by reference herein.

BACKGROUND OF THE INVENTION

1. Field of the Invention

The present invention relates to image scanning systems and more specifically to systems and techniques for correcting color registration errors when a color image is scanned.

2. Description of the Related Art

Image scanners found in conventional color copying machines usually include three line-image sensors for detecting R, G, and B colors. These colors are typically detected along a main scanning direction and a sub scanning direction. In the sub scanning direction, the line image sensors are arranged such that each sensor is located or shifted by one or more pixel sizes away from the next. Theoretically, color registration errors due to the shifts in location of the three line image sensors can be accurately corrected by making delays corresponding to the shifts in location. On the other hand, in the main scanning direction, there is theoretically no shift of pixel location among the R, G, and B line sensors, and thus no color registration error occurs between pixels at the same location in the main scanning direction.

The line-to-line distance of the three-line image sensor is an integral multiple of the pixel size in the main scanning direction. Theoretically, therefore, the color registration errors due to the difference in location of three image sensors can be exactly corrected simply by delaying signals by an amount corresponding to the line-to-line distance using a line memory.

However, in practice, color registration errors can occur due to various other factors. For example, DC color registration errors may occur due to variations in optical paths caused by an optical factor associated with the lens. As another example, AC color registration errors can occur due to mechanical vibrations. In any event, the sum of the DC color registration error and the AC color registration error appears among R, G, and B.

Further yet, as another example, in a scanner that uses a reduction optical system, the reduction ratio is not completely equal among R, G, and B, which causes color registration errors to occur. The color registration error is smallest in the center of the main scanning direction and increases toward the periphery.

Various techniques have been proposed to correct such color registration errors (some techniques may be found, for example, in Japanese Patent Laid-Open Nos. 2000-22964, 2002-112046, and 10-42157).

In most conventional color copying machines, a document to be scanned is placed on a glass, and then light is scanned over the document to produce a color image. In this case, the document remains stationary or is maintained at a fixed position during the scanning operation. Hereinafter, this scanning mode will be referred to as a fixed scan mode.

In addition to the fixed scan mode, a flow-scan mode is also known. In the flow scan mode, although the scanning position is fixed, the document does not remain stationary, but rather continues to move during the scanning operation. Note that in the case of an automatic document feeder, each document is stopped at a scanning position on the glass while the scanning operation is performed. Compared with the fixed scan mode, the flow scan mode has various advantages in terms of cost, noise, power consumption, and weight.

However, the disadvantage of the flow scan mode is that because scanning is performed at a fixed scanning position while moving a document, scanning quality is sensitive to dust or stains on glass. This deficiency is overcome by using a high quality scanner.

In a color image scanner that can operate in both fixed scan and flow scan modes, a problem with correction of color registration errors occurs, as described below. First, a document is scanned by R, G, and B line photosensors one by one. The scan order for each of the fixed scan mode and the flow scan mode is opposite, so that the signs of correction values of color registration errors become opposite. Furthermore, the fixed scan mode and the flow scan mode have different optical paths, which results in a difference in absolute correction values. That is, if the same correction values are used to correct color registration errors in both the fixed scan mode and the flow scan mode, it is difficult to eliminate the influence of color registration errors on image data in both modes.

In the above-mentioned related art (Japanese Patent Laid-Open Nos. 2000-22964 and 2002-112046), the scanner has only correction values for correcting color registration errors in the fixed scan mode. In the scanner according to those patents, color registration errors are not properly corrected in the flow scan mode, and the improper correction causes an error in black character detection, which results in degradation in image quality.

Japanese Patent Laid-Open No. 10-42157 discloses an apparatus having the fixed scan mode and the flow scan mode but includes no description of correcting color registration errors in accordance with correction values separately prepared in the fixed scan and flow scan modes.

When an image, which includes picture or text is copied by a color copying machine (using YMCK colors) and the registration error among the YMCK colors of the printer unit is greater than about 0.1 mm, color bleeding becomes noticeable particularly in printed black character images.

To avoid the above problem, the color copying machine has a black character detector for separating a given document image into a text area and a picture area, whereby characters in a detected black text area are printed in black monochrome color with enhanced edges to improve the quality of the text image. To detect a black text area, the black character detector performs at least detection of chroma.

Although the color bleeding problem is resolved by using a black character detector, if the color registration error is greater than a certain value (for example, 0.5 pixels), the black character detector determines that any part of the image does not include a black character even if the image actually includes a black character.

SUMMARY OF THE INVENTION

An advantage of the present invention is that it provides a multimode image scanning apparatus capable of properly correcting color registration errors during image scanning operations.

In an aspect, the present invention provides an image scanning apparatus comprising a light source for illuminating a document, a plurality of line sensors for receiving light reflected from the document and outputting signals corresponding to respective color components of the received light, the image scanning apparatus having a first scanning mode in which the document is scanned by the plurality of line sensors while moving the document, and a second scanning mode in which the document is placed at a fixed location and scanned by the plurality of line sensors while maintaining the document at the fixed location, the image scanning apparatus further comprising a selection device for selecting one of the first scanning mode and the second scanning mode, a color registration error correction device for correcting a color registration error between the signals output from the respective line sensors, and a control device for selecting, depending on the scanning mode selected by the selection device, a correction value used by the color registration error correction device to correct the color registration error.

The image scanning apparatus in this aspect of the present invention is capable of correctly detecting black text areas. In another aspect, the present invention provides an image scanning method, which includes the steps of providing a first scanning mode for scanning the document while the document is in motion, and providing a second scanning mode for scanning the document while the document is stationary. The image scanning method also includes the steps of selecting either the first scanning mode or the second scanning mode in response to a user initiation request, and receiving light reflected from the document during the selected scanning mode and outputting signals corresponding to respective color components of the received light. Further yet, the image scanning method includes the steps of detecting a color registration error between the signals output from the respective color components, and correcting the color registration error by using a correction value that depends on whether the first or the second scanning mode is selected.

The above and other features and advantages of the invention will become more apparent from the following detailed description taken in conjunction with the accompanying drawings.

BRIEF DESCRIPTION OF THE DRAWINGS

FIG. 3 is a cross-sectional view of a CIS module.

FIG. 4 is a diagram illustrating the structure, seen from a diagonal direction, of a CIS module.

FIG. 15 is diagram illustrating an example of data displayed on a display of an image scanning apparatus.

DETAILED DESCRIPTION OF THE INVENTION

Figure 1:
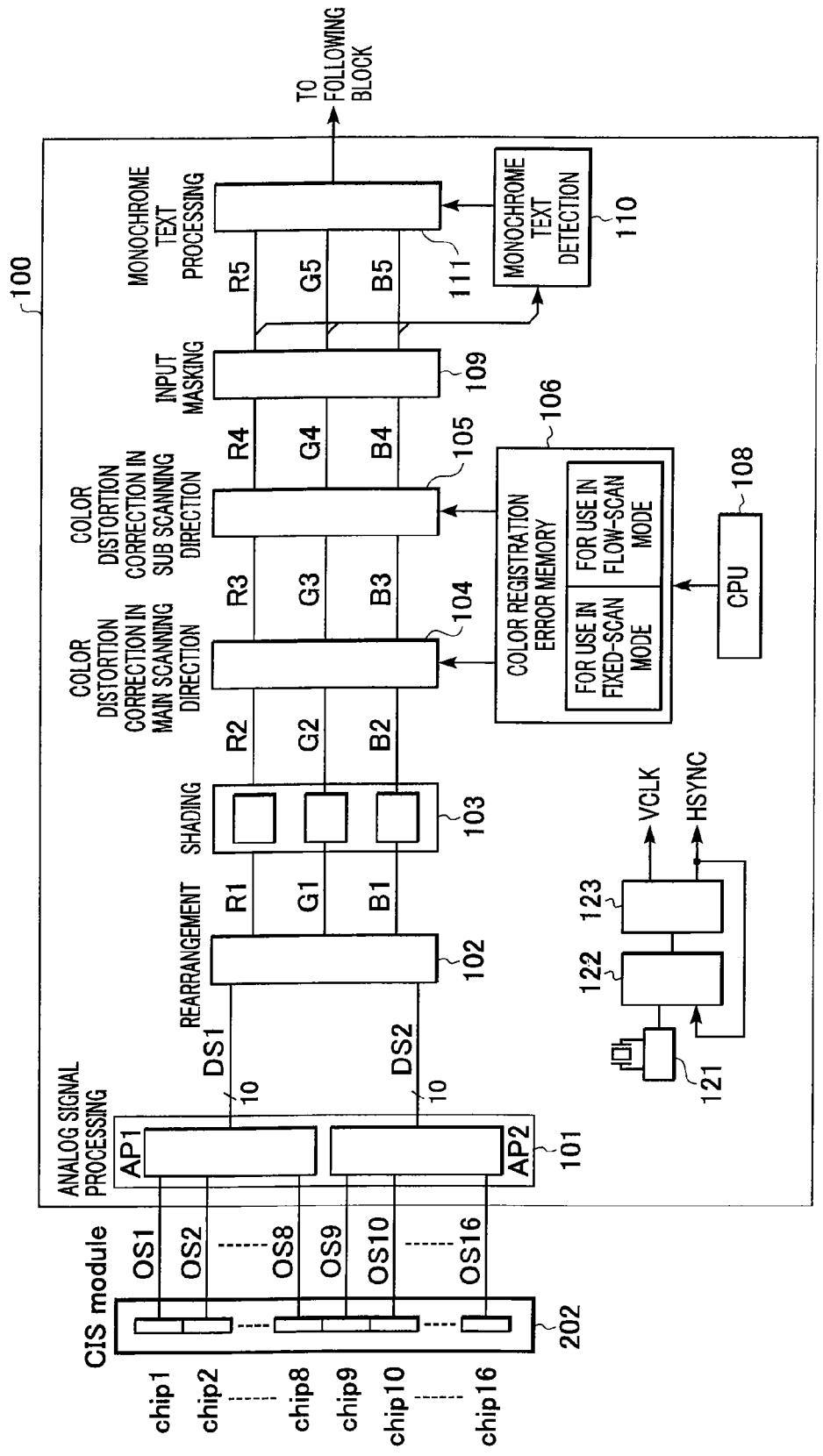
FIG. 1 is a block diagram illustrating the flow of an image signal in an image signal processor.

The present invention will now be described in detail below with reference to the accompanying drawings showing a preferred embodiment thereof. In the drawings, elements and parts, which are identical through out the views, are designated by identical reference numeral, and duplicate description thereof is omitted.

Unity Magnification Optical System

Figure 2:
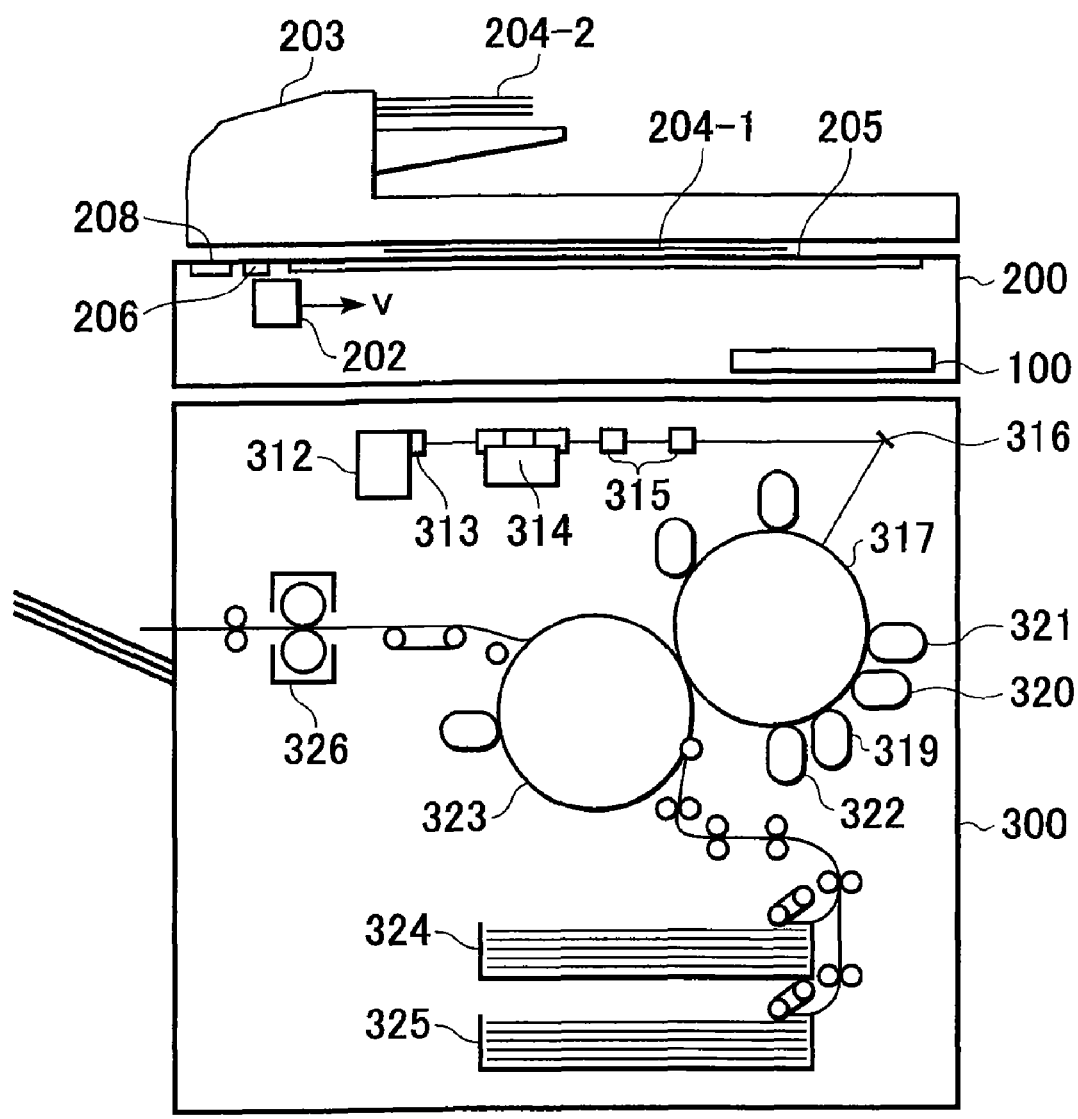
FIG. 2 is a schematic view illustrating a cross section of an image forming apparatus that includes an image scanner.

FIG. 2 is a schematic diagram illustrating a cross section of an image forming apparatus, which includes an image scanner unit according to an embodiment of the present invention. An image scanner unit 200 scans a document and performs digital signal processing on a signal obtained by scanning the document. A printer unit 300 prints on paper a full-color image corresponding to the document image scanned by the image scanner unit 200.

A CIS module 202, which is a main component of the image scanner unit 200, is described below. FIG. 3 is a cross-sectional view of the CIS module 202. The CIS module 202 includes a cover glass 2021, an illumination light source 2022 including a LED, a unity magnification imaging lens 2023 such as a SELFOC lens, a color line sensor 2024, and a substrate 2025. These components are integrally assembled into a mold 2026 to form the CIS module 202.

FIG. 4 is a diagram illustrating the structure, seen in a diagonal direction, of the CIS module 202 shown in FIG. 3. In FIG. 4, each component of CIS module 202 is shown.

Figure 5:
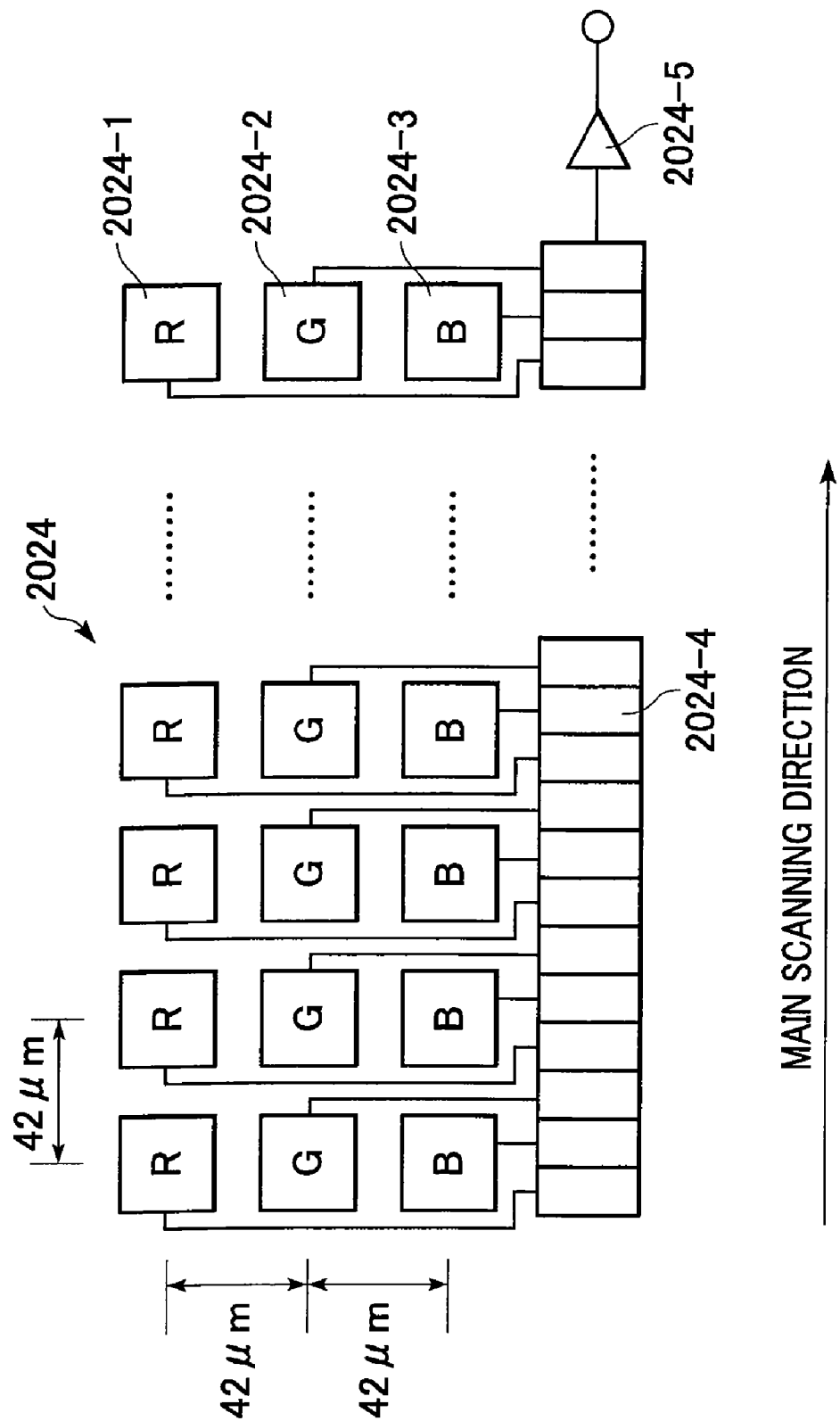
FIG. 5 is a diagram illustrating an enlarged view of a color line sensor of a CIS module.

FIG. 5 is an enlarged view of the color line sensor 2024 of the CIS module 202. In FIG. 5, 2024-1 denotes photosensors arranged in a line to detect a red light component (R). Similarly, 2024-2 and 2024-3 denote photosensors arranged in lines to detect a green light component (G) and a blue light component (B), respectively.

Three lines of photosensors having different optical characteristics are disposed in parallel such that the same line of a document is sensed by the R, G, and B sensors. Note that in this example the color line sensor 2024 is formed in a monolithic form on a single silicon chip.

The photosensor 2024-1 includes a filter R that passes a red wavelength component. Similarly, the photosensor 2024-2 includes a filter G, and the photosensor 2024-3 includes a filter B.

In FIG. 5, each rectangle designated R, G, B, represents a photosensor cell or pixel. The pixel-to-pixel distance of the photosensor cell in the main scanning direction is set to 42 μm so that 600 dpi images can be captured by the CIS module 202. In this photosensor, three photosensor lines are disposed at spatial intervals of 42 μm in the sub scanning direction.

As shown in FIG. 5, the charge transfer section 2024-4 is used to receive charges in response to a shift pulse applied at the beginning of each line.

After transferred into the charge transfer section 2024-4, the charges are transferred by time-division to an output amplifier 2024-5 in response to a transfer clock in the order GBRGBR . . . , and so on. The output amplifier 2024-5 converts the received charges into voltage signals and outputs the resultant voltage signal in the order GBRGBR . . . and so on.

Figure 6:
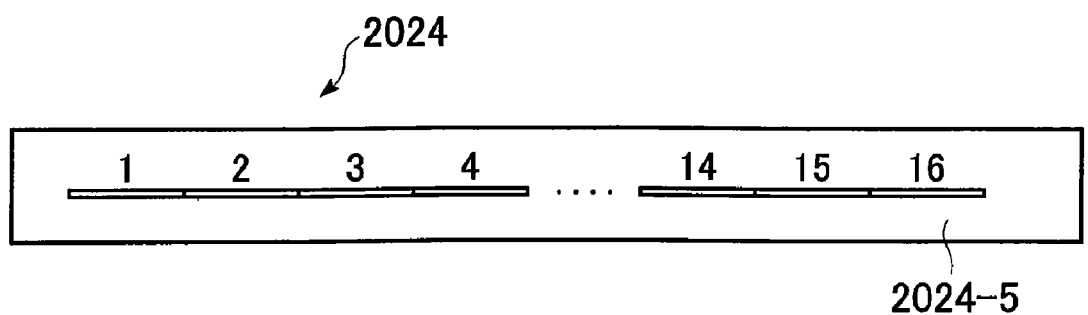
FIG. 6 is a schematic diagram illustrating a macroscopic view of the color line sensor.

FIG. 6 is a macroscopic view of a color line sensor 2024. Sixteen CCD chips, for example, are mounted in a line on a substrate 2024-5. Signals from the respective CCD chips are simultaneously output as a 16-channel signal.

The 16-channel signal is adjusted in terms of gain offset by the analog signal processor 101 shown in FIG. 1 and then converted into a digital signal by an A/D converter.

Figure 7:
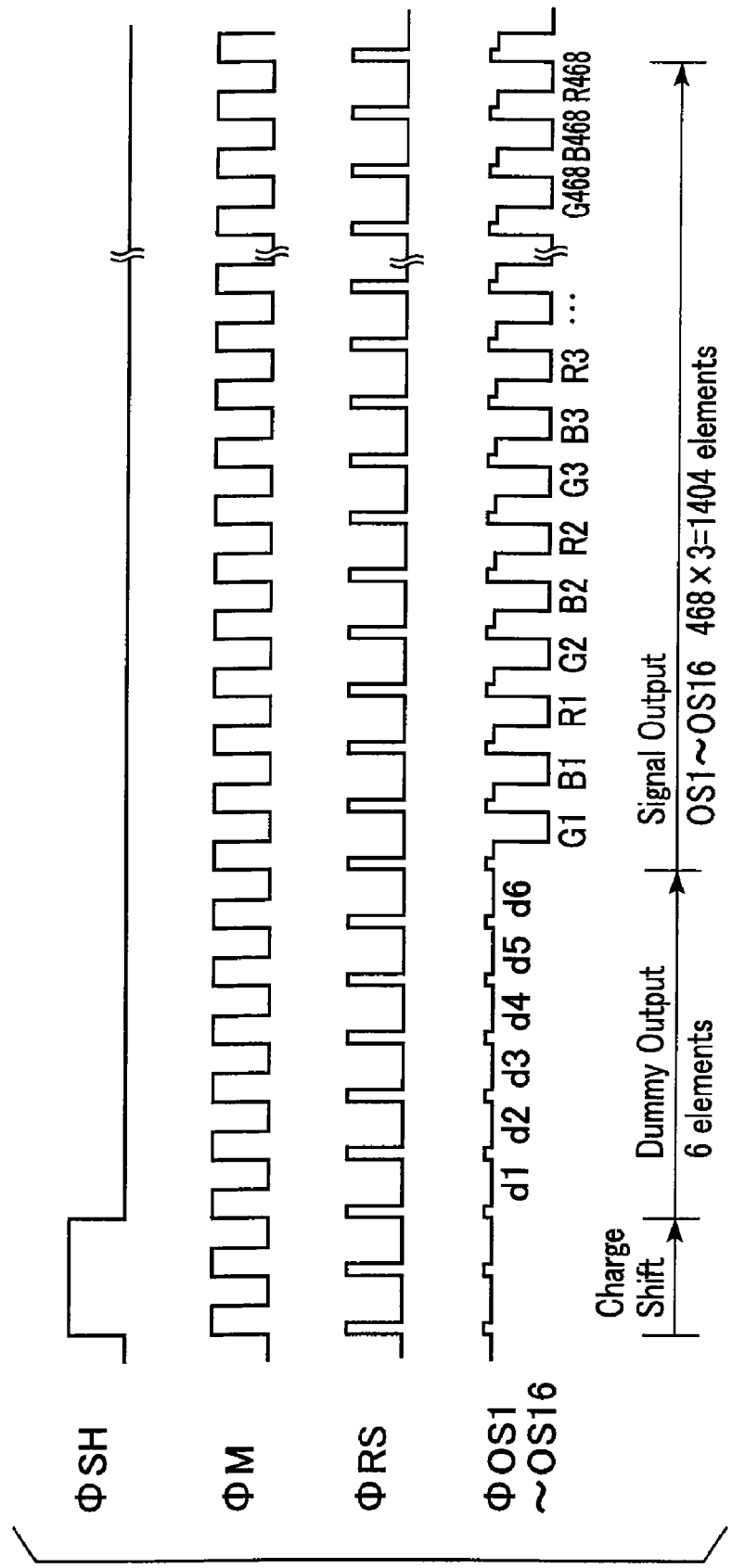
FIG. 7 is a timing chart illustrating timing associated with analog signals output from an image sensor.

FIG. 7 is a timing chart for the analog signals output from the image sensor. Note that many sensor chips operate in a similar manner as shown in this timing chart. In FIG. 7, φSH denotes a line synchronization signal, in response to which a charge is transferred from a photodiode to a CCD analog shift register.

In response to a transfer pulse signal φM, charges are sequentially transferred in the CCD analog shift register and output in the order G1, B1, R1, G2, B2, R2, . . . , and so on (as shown by OS1 to OS16 from the output amplifier after a dummy output signal). φRS denotes a reset pulse signal to reset the CCD.

The operation of scanning a document is described as follows. As shown in FIG. 2, in the image scanner unit 200, a document 204-1 placed on a document glass plate (platen) 205 is scanned while a document pressing plate (of an automatic document feeder (ADF) 203) is used to secure the document. Hereinafter, the mode in which a document remains fixed on the platen 205 while the document is scanned is referred to as a fixed scan mode. The illumination light source 2022 in the CIS module shown in FIG. 3 illuminates the document. Light reflected from this document is focused via the lens 2023 onto the color line sensor 2024 thereby forming an image of the document on the color line sensor 2024.

The image scanner unit 200 has another scanning mode, in which the CIS module 202 is moved to a scanning position of a flow-scan glass 208, and documents are sequentially fed from the ADF 203 such that when each document passes over the scanning position, the image of each document is read. Note that the scanning position is fixed over the entire period in which each document is read. Hereinafter, this scanning mode will be referred to as a flow scan mode.

Correction data (reference data) for use in shading correction is produced using a white reference plate 206. The white reference plate 206 is scanned by the photosensors 2024-1 to 2024-3 disposed on the color line sensor and resultant data is employed as correction data (reference data). The white reference plate 206 has reflection characteristics substantially constant over the visible light wavelength range. On the basis of the obtained correction data, data output from each of the photosensors 2024-1 to 2024-3 is corrected.

Image data obtained by reading each document at the scanning position is processed by an image signal processor later described below. At a stage following the image signal processor, the image signal output from the image signal processor is separated into color components of magenta (M), cyan (C), yellow (Y), and black (Bk), and resultant color component data are transmitted to a printer unit 300. The printer unit 300 forms a color image on paper on the basis of the received image data.

The structure of the printer unit 300 is described below. First, respective color component signals of the received image data M, C, Y, and Bk are sent to a laser driver 312. The laser driver 312 drives a semiconductor laser 313 such that a laser beam output from the semiconductor laser 313 is modulated in accordance with each color component signal. The laser beam output from the semiconductor laser 313 is scanned over the photosensitive drum 317 via a polygon mirror 314, an f-θ lens 315, and a mirror 316.

A developing unit includes a magenta developing unit 319, a cyan developing unit 320, a yellow developing unit 321, and a black developing unit 322. Each of these four developing units is brought into contact with the photosensitive drum 317 thereby causing electrostatic latent images of M, C, Y, and Bk formed on the photosensitive drum 317 to be developed with corresponding toners. Paper fed from a paper cassette 324 or 325 is wound around the transfer drum 323, and a developed toner image on the photosensitive drum 317 is transferred to the paper.

Thus, the toner image of each of four colors M, C, Y, and Bk is in turn transferred to the paper. Next, the paper is passed through a fuser unit 326 to fuse the toner on the paper, after which the paper is ejected onto an output tray.

Now, an image signal processor 100 is described as follows. FIG. 1 is a block diagram illustrating image signal flow in the image signal processor 100 of the image scanner unit 200. An image signal output from the CIS module 202 is input to an analog signal processor 101. After the image signal is adjusted in terms of gain and offset, the image signal is converted from analog form into digital form.

The digital signal is properly arranged by a signal arrangement unit 102 such that respective color signals are converted into 10-bit digital image signals R1, G1, and B1. The digital image signal is then input to the shading corrector 103 and subjected to shading correction using the reference data produced using the white reference plate 206.

The clock generator 121 generates a clock pulse VCLK corresponding to each pixel. A main scanning address counter 122 counts clock pulses generated by the clock generator 121 and outputs a one-line pixel address. A decoder 123 decodes the main scanning address supplied from the main scanning address counter 122 and generates sensor driving signals for driving the sensor line by line, such as a shift pulse φSH and a reset pulse φRS, and also generates a line synchronization signal HSYNC. The main scanning address counter 122 is cleared by the line synchronization signal HSYNC and starts counting in terms of the main scanning address of a next line.

After the shading correction, errors in the main scanning direction are first corrected by sending the image signal to a main-scanning-direction color-registration-error correction unit 104 and then to a sub-scanning-direction color-registration-error correction unit 105 to correct color registration errors in the sub scanning direction.

A color registration error correction value memory 106 has color registration error correction values for use in the fixed scan mode and also has color registration error correction values for use in the flow scan mode. Under the control of CPU 108, color registration error correction values are supplied to the main-scanning-direction color-registration-error correction unit 104 or the sub-scanning-direction color-registration-error correction unit 105 depending on the selected scanning mode. The CPU 108 controls the general scanning operation and the switching between scanning mode operations.

As shown in FIG. 1, an input masking unit 109 uses matrix operations to optimize the color space. A black character detector 110 detects a black text area in image information (image signal) and separates the image information into the black text area and non-black text area. The black character detector 110 sends separation information to a character processor 111, which processes information in the black text area so that edges are enhanced using a spatial filter and a sharp character image is printed in a single black color. After completion of processing on the black text area, the signal is sent to the following stage.

Figure 8:
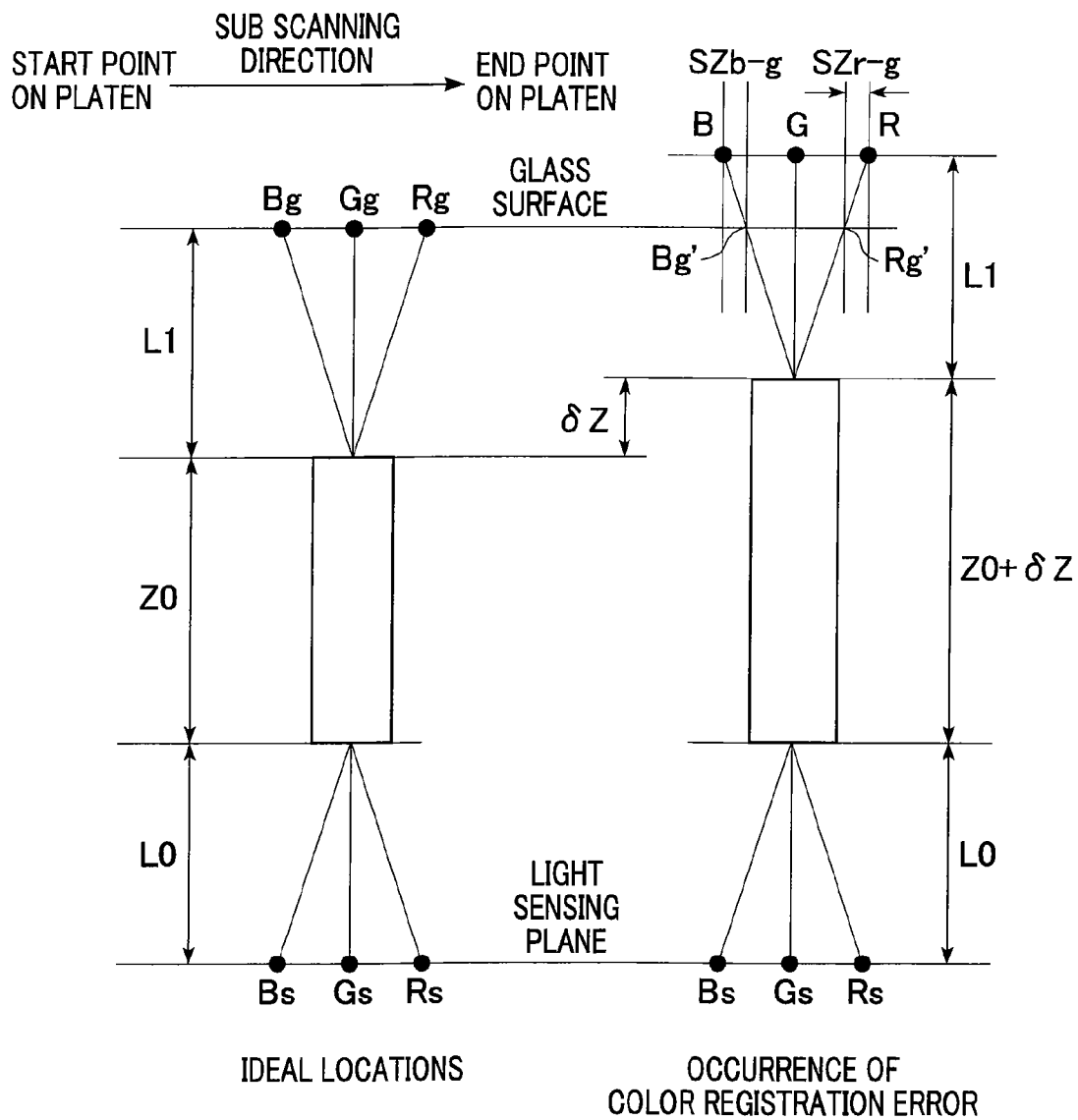
FIG. 8 is a schematic diagram illustrating a color registration error in a sub scanning direction.

FIG. 8 is a schematic diagram for illustrating a color registration error in the sub scanning direction. In this figure, a lateral view of the CIS module 202 is shown. Reference numeral 2023 denotes a rod lens array. As shown, of the portion of FIG. 8 labeled "IDEAL LOCATIONS" shows ideal positional relationships, intended by design, among elements of the CIS module 202. In this ideal state, the rod lens array has a length of L0, the distance between the lens and the light-sensing surface of the image sensor is L0, and the distance between the lens and the document plane (glass surface) is L1.

In the ideal state, the line-to-line distance Rs-Gs of the image sensor as measured in the light sensing surface plane is equal to the distance Rg-Gg between lines to be sensed in the glass surface plane. Similarly, the distance Bs-Gs is equal to the distance Bg-Gg. Note that there is no color registration error in the sub scanning direction in this ideal state.

However, in a practical module, the above-described distances deviate from ideal values because of positioning errors that can occur when parts are assembled together, or due to distortion of the lens, and/or other factors. The portion of FIG. 8 labeled "OCCURRENCE OF COLOR REGISTRATION ERROR" shows color registration error caused by a deviation $\delta Z$ from the ideal length of the rod lens array. In this case, the ideal document position is in a plane deviated upward by $\delta Z$ from the glass surface. However, the actual document position is in the glass surface plane, and thus the distance Rs-Gs becomes greater than the distance Rg'-Gg'. This causes a color registration error as large as SZr-g. Similarly, the distance Bs-Gs becomes greater than the distance Bg'-Gg', and a color registration error as large as SZr-g occurs. Note that it is assumed that the distances are defined with respect to G, and color registration errors are positive when deviations occur toward the scanning end.

Note that, in this state, Rg' is located to the left of Rg, and Bg' is located to the right of Bg, and thus color registration errors are opposite in direction for Rg' and Bg'. Herein, it is assumed that the magnitude of each color registration error is equal. In this state, if the image of the document is read, color registration errors in the sub scanning direction occur.

Figure 10:
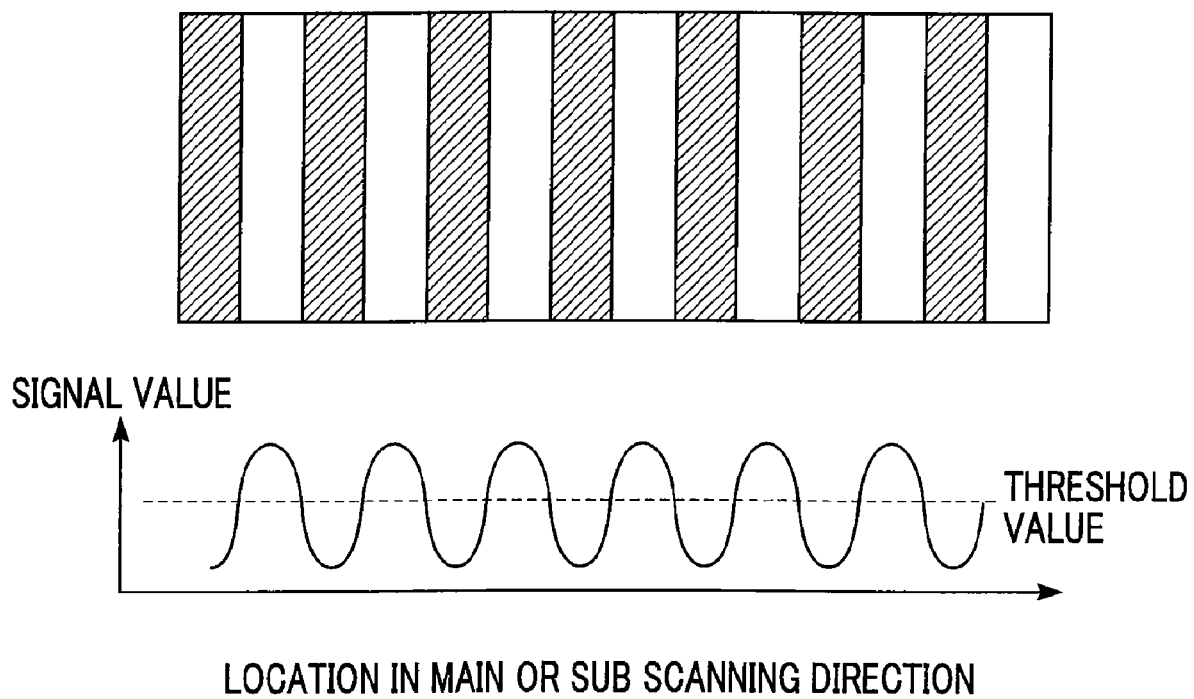
FIG. 10 is a diagram illustrating use of a line-and-space pattern to detect a color registration error in the sub scanning direction.

FIG. 10 shows a line-and-space chart used to measure color registration errors in the sub scanning direction. The line-and-space chart is scanned such that lines and spaces appear alternately. For example, if a line-and-space chart with a density of 50 line-and-space pairs per inch is scanned from left to right in the figure, a resultant signal has a waveform in which high and low levels appear alternately, as shown at the bottom of FIG. 10. If this signal waveform is thresholded at a particular threshold value (denoted by a broken line in FIG. 10), the signal is thresholded at particular locations in the sub scanning direction.

Figure 11:
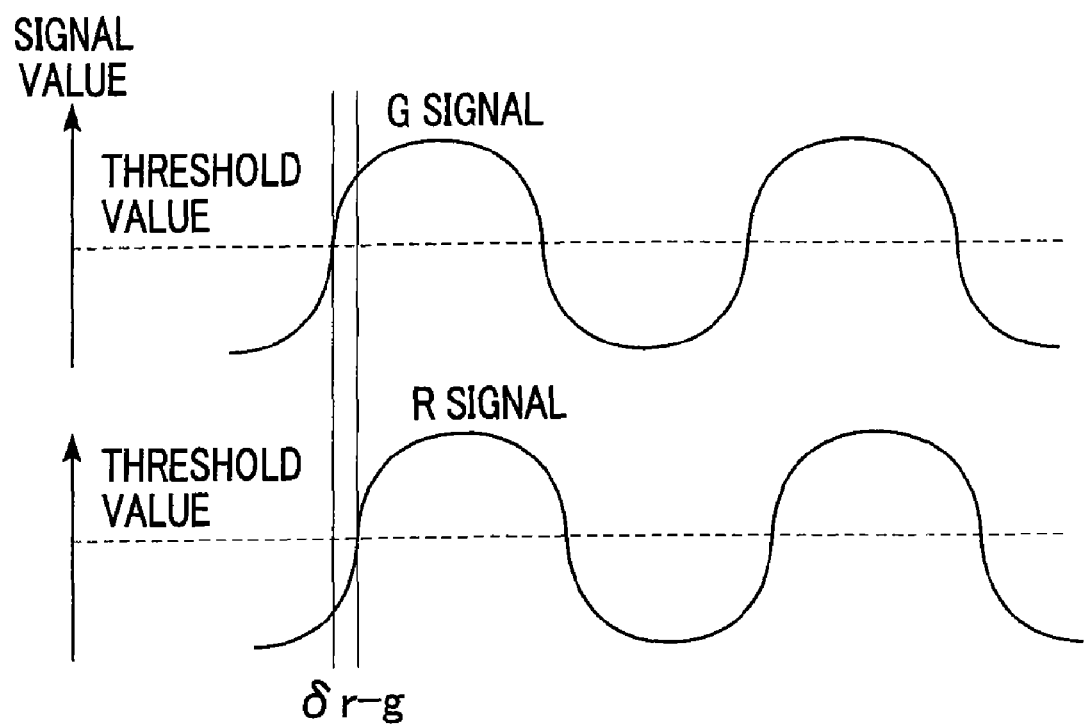
FIG. 11 is a diagram illustrating a color registration error in a sub scanning direction.

FIG. 11 is a diagram showing R and G color signals to illustrate color registration errors in the sub scanning direction. When a document on the glass plate is scanned in the fixed scan mode, an image signal is read in order of R, G, and B. To compensate for the delays in read timing, signal components read earlier are delayed by an integral multiple of lines. After compensating for delays in read timing, the signals have waveforms such as those shown in FIG. 11. Note that only signals of R and G are shown in FIG. 11. In this specific example shown in FIG. 11, the signal R is slightly shifted to the right with respect to the signal G due to a color registration error ($\delta$r-g).

If the color registration error $\delta$r-g is determined for each edge of the line-and-space pattern, and if the mean value of color registration errors is calculated, the DC offset of the color registration in the sub scanning direction is given by the mean value. In general, the color registration error in the sub scanning direction is represented by the DC offset.

Figure 12:
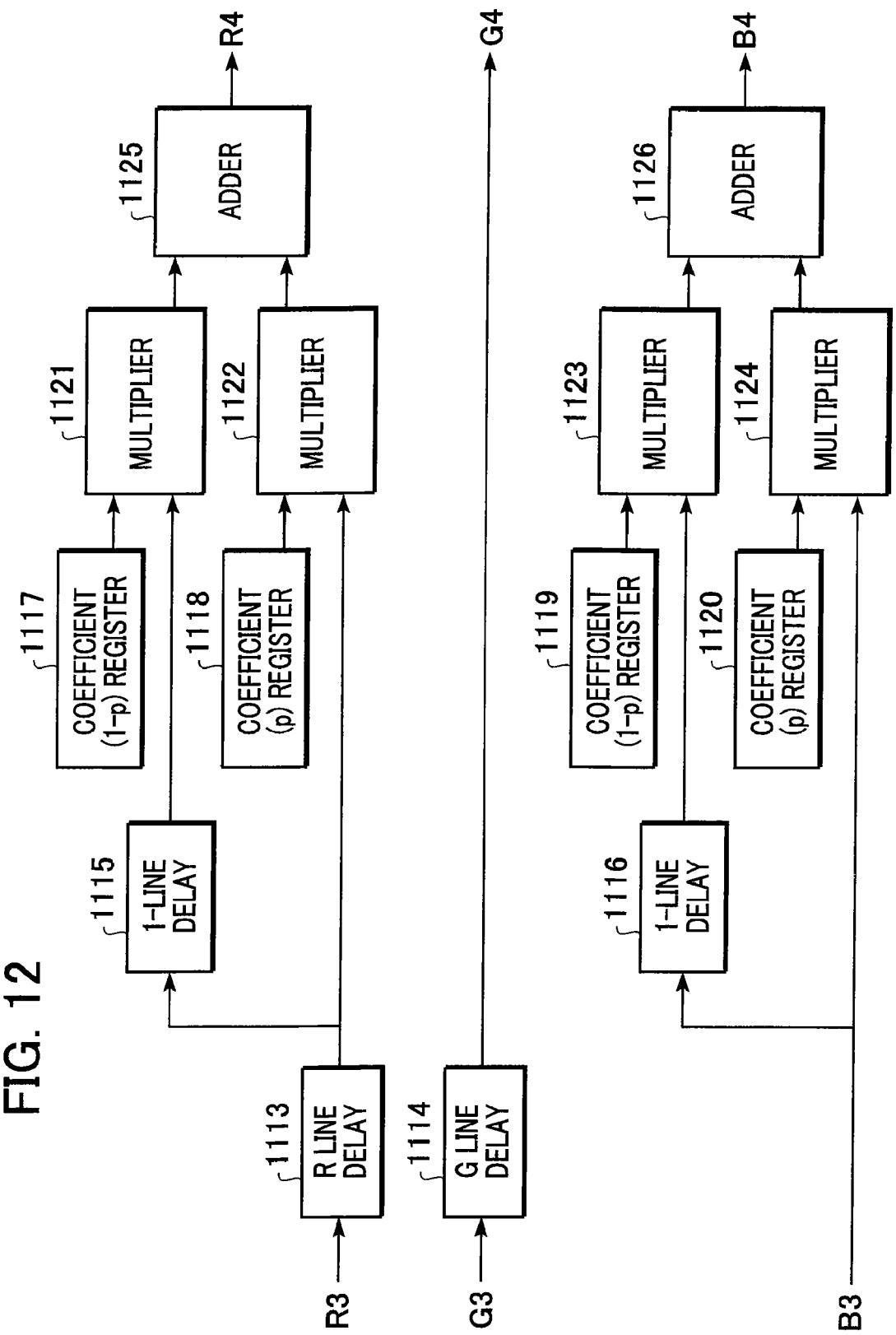
FIG. 12 is a block diagram illustrating the internal structure of a sub-scanning-direction color-registration-error correction unit.

FIG. 12 is a block diagram illustrating the internal structure of the sub-scanning-direction color-registration-error correction unit 105, which is a circuit for correcting the color registration errors in the sub scanning direction by means of calculating the weighted mean. Herein, by way of example, assume that color registration errors $\delta$r-g and $\delta$b-g are 0.3 pixels and −0.3 pixels, respectively. The sign of the value of each registration error is defined such that, in FIG. 11, deviations to the right with respect to the G signal are positive.

That is, in this case, the signal R has a deviation of 0.3 pixels from the signal G, and the signal B has a deviation of −0.3 pixels from the signal G. When an image of a document is read, these deviations cause color components to appear to the right and left of a black line. This appearance of color components causes the chroma detector (of black character detector 110) to incorrectly determine that the black line is a colored line, and thus the line, which should be printed in a single black color, is printed in four colors. As a result, color bleeding occurs when characters are printed.

The color registration error can be deleted by shifting the signal R by 0.3 pixels toward the signal G to delete the deviation between the signal R and the signal G, and by shifting the signal B by 0.3 pixels toward the signal G to delete the deviation between the signal B and the signal G.

The correction processing is described in further detail below. In the following description, by way of example, a color registration error between two lines in the sub scanning direction is corrected by means of calculating the weighted means. In the case in which signals are simply delayed in units of integral multiples of lines, the color registration error of R on a Nth line with respect to G on the Nth line in the sub scanning direction can be corrected by calculating the weighted means such that the pixel of R on the Nth line is multiplied by a factor of 0.7, the pixel of R on a (N−1)th line is multiplied by a factor of 0.3, and the products are added together. Similarly, the color registration error of B on the Nth line with respect to G on the Nth line in the sub scanning direction can be corrected by multiplying the pixel values of B on the (N+1)th line and Nth line by factors 0.3 and 0.7 respectively and adding the resultant products.

The difference in color registration error in the sub scanning direction between the fixed scan mode and the flow scan mode is now described in further detail below. As shown in FIG. 8, image sensors are arranged in the order B, G, and R in a direction from the origin on the platen glass (the left end in FIG. 2) to the end point (the right end in FIG. 2). By virtue of the imaging characteristics of the rod lens array 2023, lines to be sensed, in the glass surface plane, are also located in the order B, G, and R in the direction from the origin on the platen glass to the end point. In the fixed scan mode, a document is placed at a fixed location on the platen glass, and the document is scanned by moving the CIS to the right. In the scanning process, line signals are read line by line in the order of R, G, and B. That is, a line signal of G is delayed by one line from R, and a line signal of B is further delayed by one line.

On the other hand, in the flow scan mode, the CIS is maintained at a fixed position below the flow-scan glass 208, and the document is scanned while moving the document to the right over the flow-scan glass 208. In this case, line signals are read line by line in the order of B, G, and R such that a line signal of G is delayed by one line from a line signal of B, and a line signal of R is further delayed by one line. Herein, it is assumed that color registration errors $\delta$r-g and $\delta$b-g are equal in absolute value, then the signs thereof become opposite between the fixed scan mode and the flow scan mode.

In practice, the absolute values of color registration errors $\delta$r-g and $\delta$b-g can be different from each other due to a difference in thickness between the platen glass 205 and the flow-scan glass 208, or due to a slight upward deviation of the document moving path from the glass surface. That is, when the same line-and-space chart is scanned, there are differences not only in the absolute values but also in the signs of the color registration errors δr-g and δb-g between the fixed scan mode and the flow scan mode.

In particular, in a system using a CIS module including a rod lens array as in the present embodiment, because of its short optical path, the color registration errors and the differences between the fixed scan mode and the flow scan mode are sensitive to optical path changes.

Basically, optical color registration errors can occur not only in the sub scanning direction but also in the main scanning direction. Since color registration errors in the main scanning direction are greater in reduction optical system than in unity magnification optical systems, and such errors are discussed below with reference to the reduction optical system.

Reduction Optical System

Features of a reduction optical system different from those of the above-described unity magnification system will now be described.

Figure 14:
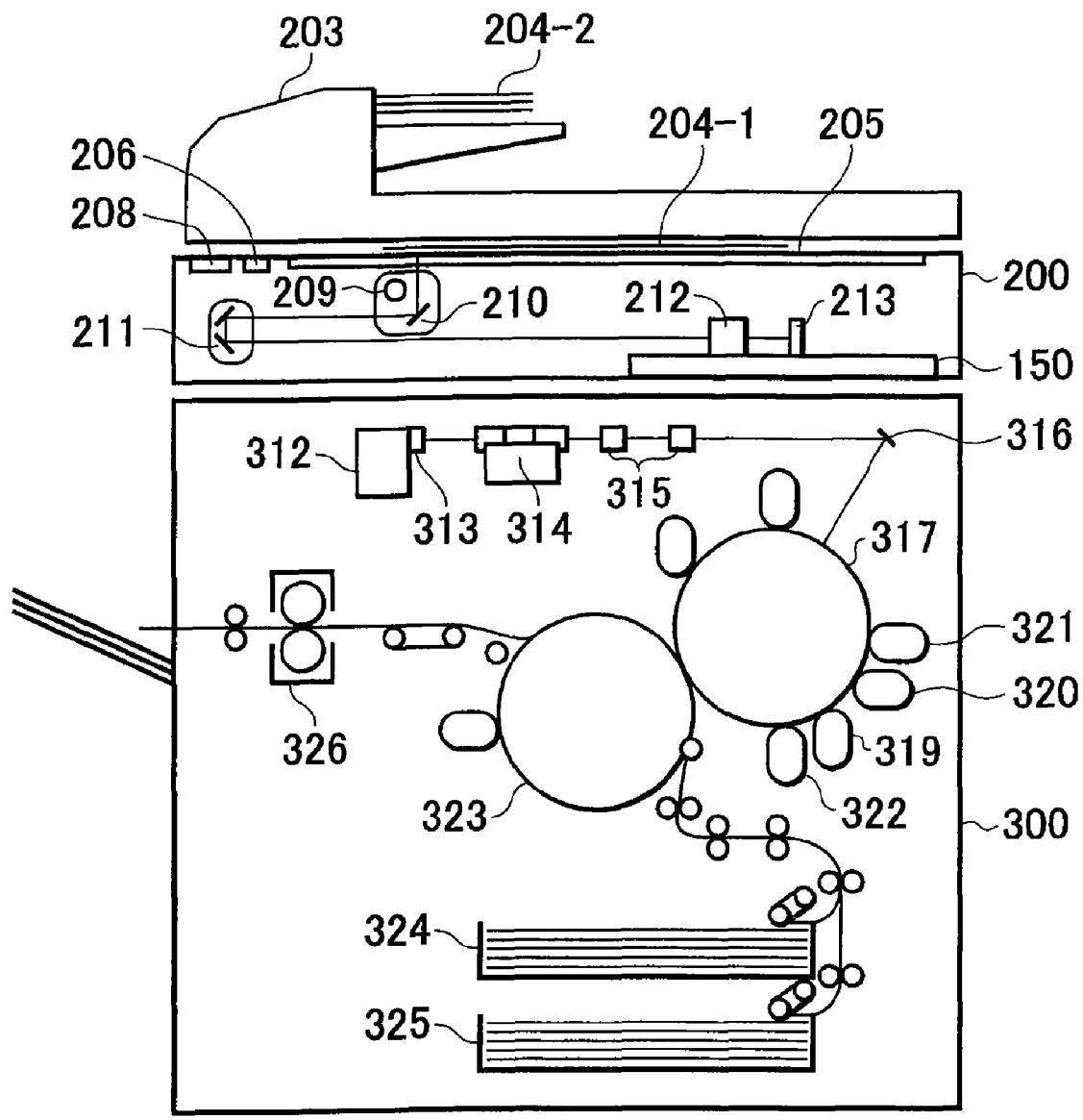
FIG. 14 is a schematic view illustrating a cross section of an image forming apparatus including an image scanner.

FIG. 14 is a schematic diagram illustrating a cross section of an image forming apparatus that includes an image scanner unit. The image scanner unit 200 scans a document and performs digital signal processing on a signal obtained by scanning the document. A printer unit 300 prints on paper a full-color image corresponding to the document image scanned by the image scanner unit 200.

A light source 209 including a xenon lamp illuminates a document. Light reflected from the document illuminated with light emitted by the light source 209 falls on a mirror 210 and is bent by 90° toward a mirror set 211, which includes at least two mirrors. The mirror set 211 reflects the light back in a direction parallel with but opposite the direction in which the light is incident on the mirror set 211. The light is then passed through a reduction imaging lens 212 and an image is formed on a 3-line CCD image sensor 213. The mirror 210 and the light source 209 are moved together at a speed V to scan a document placed on the platen glass 205. When the mirror 210 and the light source 209 are moving, the mirror set 211 is moved at a speed one-half the speed V in the same direction. The structure described above is commonly used in image scanners using a reduction optical system.

Note that the image processing unit and other parts similar to those used in the image scanner of the unity magnification optical system are not described herein.

Color registration errors in the main scanning direction in reduction optical systems are discussed below.

In reduction optical systems, in general, a rather large color registration error occurs in the main scanning direction. This color registration error is caused by chromatic aberrations of RGB light, although it also depends on other factors such as the lens design, scanner component variations and positioning errors that occur when the components are assembled or attached.

In general, the reduction imaging lens 212 is formed of a plurality of lenses. However, it is difficult to form an ideal reduction-imaging lens because there is a limitation on both the number of lenses and the type of glass material usable for the lenses. In some cases, color registration errors in the main scanning direction in a peripheral area can be as great as 0.4 pixels in absolute value between R and G or between G and B.

Figure 9:
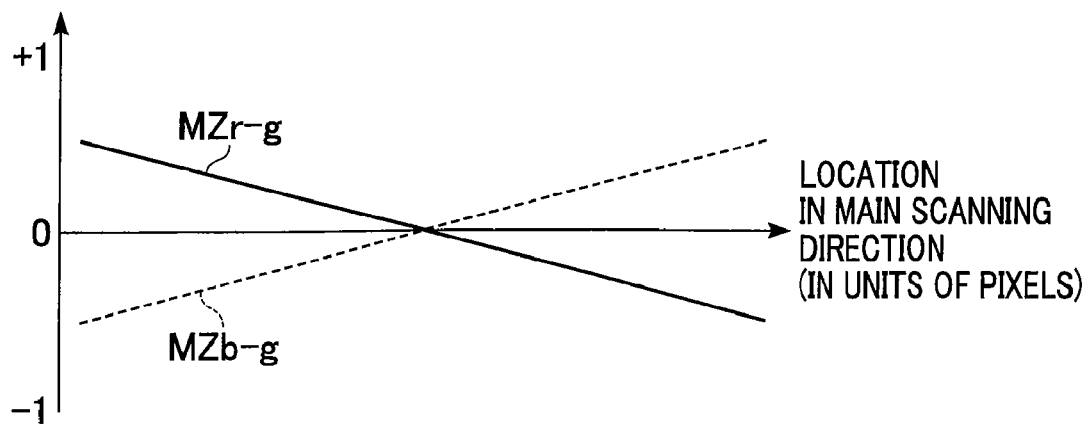
FIG. 9 is a diagram illustrating color registration error in a main scanning direction.

FIG. 9 is a diagram illustrating simplified color registration errors in the main scanning direction. In FIG. 9, the horizontal axis represents the pixel location, and the vertical axis represents the color registration error in the main scanning direction. The color registration error MZr-g between R and G is about 0.4 pixels at the left end, 0 at the middle, and −0.4 at the right end. On the other hand, the color registration error MZb-g between G and B is about −0.4 pixels at the left end, 0 at the middle, and 0.4 at the right end. Those values shown in FIG. 9 are examples, and the color registration errors can have other values. The sign of each color registration error is defined with respect to G. Although the actual color registration errors include an AC component and are slightly curved when plotted on a graph, each color registration error can be well approximated by a line.

The color registration errors in the main scanning direction are measured by scanning a line-and-space chart in a manner similar to the sub scanning direction except that the position of the line-and-space chart is rotated by 90° relative to that of the sub scanning direction.

Because the color registration errors in the main direction vary depending on the scanning position (the pixel position) in the main scanning direction, it is necessary to correct each pixel position. The circuit of the main-scanning-direction color-registration-error correction unit shown in FIG. 1 is similar to that used for correcting color registration errors using weighted mean calculations described with reference to FIG. 12. However, the difference is that the value stored in the register can be switched depending on the scanning position (the pixel position) in the main scanning direction.

The main-scanning-direction color-registration-error correction unit includes a position counter for indicating the position in the main scanning direction. The color registration errors are determined for all pixel positions or determined by means of linear interpolation from values of pixels at particular intervals, and correction values are properly determined by changing the weighting factor depending on the position in the main scanning direction. Basically, the weighted mean calculator in the sub scanning direction is similar to that shown in FIG. 12.

The correction values in the main scanning direction, as in the sub scanning direction, should be determined separately for the fixed scan mode and the flow scan mode, because there are differences in optical conditions and scanning conditions between the fixed scan mode and the flow scan mode as described earlier in the discussion on the color registration errors in the sub scanning direction. The color registration errors are mirror-symmetrical between the fixed scan mode and the flow scan mode, and thus the sign of each of the color registration errors MZr-g and MZb-g shown in FIG. 9 for the fixed scan mode is opposite that of the flow scan mode.

As described above, color registration errors in the main scanning direction and the sub scanning direction can occur in both types of scanners, that is, the scanner using the unity magnification optical system and the scanner using the reduction optical system.

Figure 13:
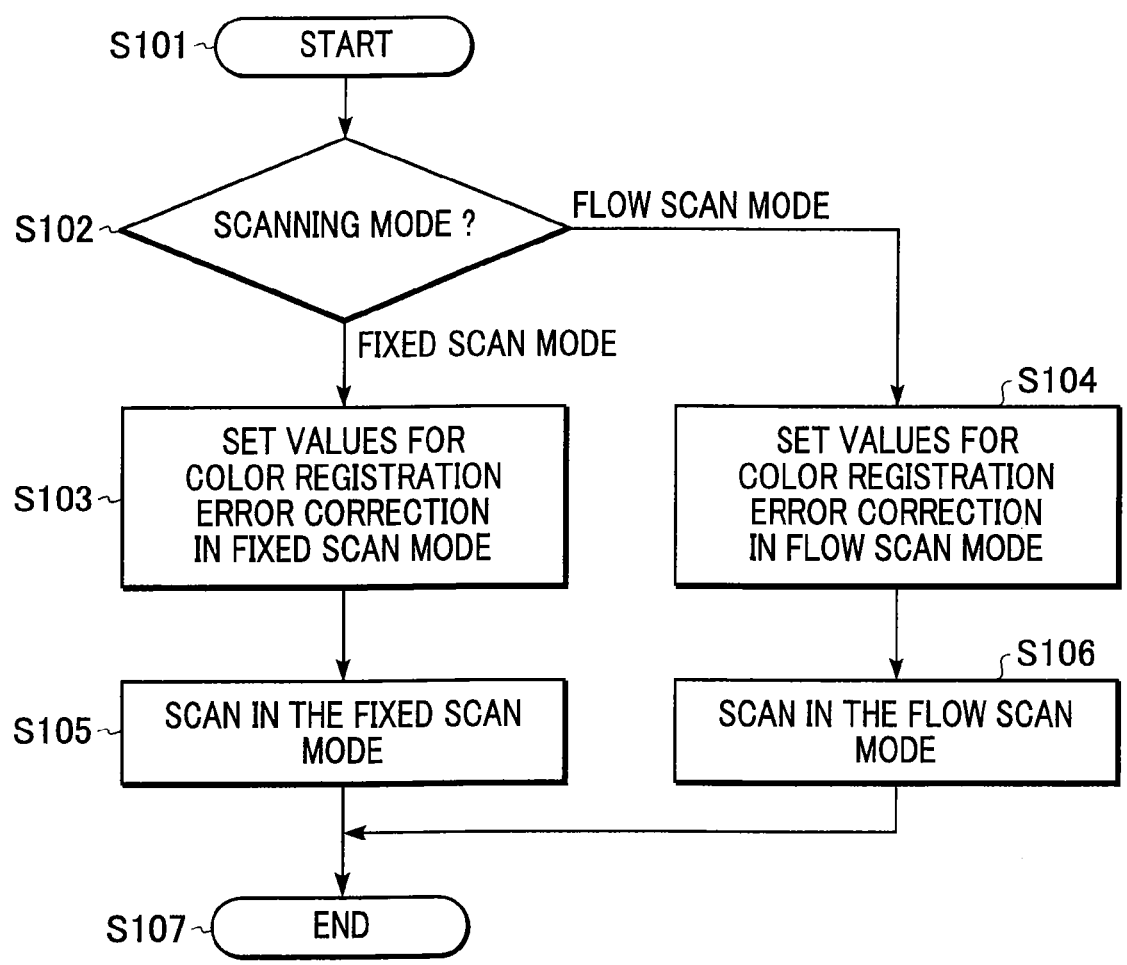
FIG. 13 is a flow chart showing a scanning operation in a fixed scan mode or a flow scan mode.

FIG. 13 is a flow chart illustrating selection of either the fixed scan mode or the flow scan mode for a document scanning operation. This scanning operation is performed under the control of the CPU 108.

When a copy button (start key) (not shown) is pressed in step S101, a sequence of processing steps is started. In step 102, the CPU 108 determines whether a document is placed on the document tray of the ADF 203. If a document is on the document tray, the CPU 108 determines that the document should be scanned in the flow-scan mode. However, if no document is on the document tray of the ADF 203, the CPU 108 determines that scanning should be performed in the fixed scan mode. When it is determined that scanning should be performed in the fixed scan mode, the process proceeds to step S103. On the other hand, the process proceeds to step S104 when it is determined that scanning should be performed in the flow scan mode.

In S103, under the control of the CPU 108, correction values for correcting color registration errors in the fixed scan mode are read from the color registration error correction value memory 106 shown in FIG. 1 and set in the main-scanning-direction color-registration-error correction unit 104 and the sub-scanning-direction color-registration-error correction unit 105.

On the other hand, in step S104, under the control of the CPU 108, correction values for correcting color registration errors in the flow scan mode are read from the color registration error correction value memory 106 shown in FIG. 1 and set in the main-scanning-direction color-registration-error correction unit 104 and the sub-scanning-direction color-registration-error correction unit 105.

In S105, scanning is performed in the fixed scan mode in which each document is stationary or maintained at a fixed position. On the other hand, in S106, scanning is performed in the flow scan mode in which each document is in motion during the scanning operation. When the scanning operation in step S105 or S106 is completed, the process proceeds to step S107, and the sequence of processing steps is completed.

By selecting the correction values for correcting color registration errors depending on whether scanning is performed in the fixed scan mode or the flow scan mode, as described above, it is possible to properly correct the color registration errors in the main scanning direction and the sub scanning direction.

The correction values for correcting the color registration errors in the main scanning direction and in the sub scanning direction may be input via an operation control unit including input keys and a display such as a liquid crystal display and may be displayed on the display of the operation control unit. This makes it possible to easily optimize the correction values when, for example, an optical unit such as a CIS module or a CCD lens unit is exchanged. An example of a set of correction values displayed on the display is shown in FIG. 15.

In FIG. 15, the color registration error correction values in the main scanning direction are given only for one end of the scanning range in the main scanning direction because correction values are approximately symmetrical between left and right parts of the scanning range in the main scanning direction.

The present invention may be applied to a system including a plurality of apparatuses, and may also be applied to a single apparatus. The advantages of the present invention may also be achieved by supplying a storage medium, on which a software program for implementing the functions of any embodiment described above is stored, to a system or apparatus whereby a controller of the system or the apparatus reads and executes the software program stored on the storage medium.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image scanning apparatus comprising:
a light source configured to illuminate a document;
a plurality of line sensors configured to receive light reflected from the document and output signals corresponding to respective color components of the received light, the plurality of line sensors being disposed in parallel with each other;
a selection device configured to select one of a first scanning mode and a second scanning mode, wherein the first scanning mode allows a document to be scanned by the plurality of line sensors while the document is moved in a sub scanning direction perpendicular to a main scanning direction parallel with the plurality of line sensors and, wherein the second scanning mode allows the document to be scanned in the sub scanning direction by the plurality of line sensors while the document is stationary, wherein the order in which the plurality of line sensors receive the light reflected from the document in the first scanning mode is opposite to the order in which the plurality of line sensors receive the light reflected from the document in the second scanning mode; and
a color registration error correction device configured to correct a color registration error between the signals output from the respective line sensors, and
wherein the color registration error correction device corrects a signal of interest pixel based on a signal of an adjacent pixel and a first correction value in a case where the selection device selects the first scanning mode and corrects the signal of interest pixel based on the signal of the adjacent pixel and a second correction value in a case where the selection device selects the second scanning mode.

2. An image scanning apparatus according to claim 1, wherein the color registration error in the first scanning mode is opposite in sign to the color registration error in the second scanning mode.

3. An image scanning apparatus according to claim 1, further comprising a storage device for storing the first correction value and also storing the second correction value,
wherein the first or second correction value is respectively read from the storage device depending on the first or second scanning mode selected by the selection device, and the color registration error in the first or second scanning mode is respectively corrected in accordance with the first or second correction value.

4. An image scanning apparatus according to claim 1, further comprising an image processing device for detecting a black character based on the signal corrected by the color registration error correction device.

5. An image scanning apparatus according to claim 3, wherein the first correction value and the second correction value are acquired by scanning a test chart.

6. An image scanning apparatus according to claim 3, further comprising an operation control unit by which the first correction value and the second correction value are allowed to be set and/or changed.

7. An image scanning apparatus according to claim 1,
wherein the color registration error correction device corrects the color registration error in the main scanning direction and a color registration error in the sub scanning direction.

8. An image scanning apparatus comprising:
a light source for illuminating a document;
a plurality of line sensors for receiving light reflected from the document and outputting signals corresponding to respective color components of the received light;
a selection device for selecting between a first scanning mode and a second scanning mode, wherein the first scanning mode allows a document to be scanned by the plurality of line sensors while the document is in motion and, wherein the second scanning mode allows the document to be scanned by the plurality of line sensors while the document is stationary;
a color registration error correction device for correcting a color registration error between the signals output from the respective line sensors;
a control device for selecting, depending on the scanning mode selected by the selection device, a correction value used by the color registration error correction device to correct the color registration error; and
a storage device for storing a first correction value by which to correct the color registration error of the signal read in the first scanning mode and also storing a second correction value by which to correct the color registration error of the signal read in the second scanning mode,
wherein the first or second correction value is read from the storage device depending on the scanning mode selected by the selection device, and the color registration error is corrected in accordance with the read correction value, and
wherein the first correction value and the second correction value are acquired by scanning a test chart.

9. An image scanning apparatus comprising:
a light source for illuminating a document;
a plurality of line sensors for receiving light reflected from the document and outputting signals corresponding to respective color components of the received light;
a selection device for selecting between a first scanning mode and a second scanning mode, wherein the first scanning mode allows a document to be scanned by the plurality of line sensors while the document is in motion and, wherein the second scanning mode allows the document to be scanned by the plurality of line sensors while the document is stationary;
a color registration error correction device for correcting a color registration error between the signals output from the respective line sensors;
a control device for selecting, depending on the scanning mode selected by the selection device, a correction value used by the color registration error correction device to correct the color registration error;
a storage device for storing a first correction value by which to correct the color registration error of the signal read in the first scanning mode and also storing a second correction value by which to correct the color registration error of the signal read in the second scanning mode; and
an operation control unit by which the first correction value and the second correction value are allowed to be set and/or changed,
wherein the first or second correction value is read from the storage device depending on the scanning mode selected by the selection device, and the color registration error is corrected in accordance with the read correction value.

10. An image scanning apparatus comprising:
a light source configured to illuminate a document;
a plurality of line sensors configured to receive light reflected from the document and output signals corresponding to respective color components of the received light;
a selection device configured to select one of a first scanning mode and a second scanning mode, wherein the first scanning mode allows a document to be scanned by the plurality of line sensors while the document is moved in a sub scanning direction perpendicular to a main scanning direction parallel with the plurality of line sensors and, wherein the second scanning mode allows the document to be scanned in the sub scanning direction by the plurality of line sensors while the document is stationary; and
a color registration error correction device for correcting a color registration error between the signals output from the respective line sensors,
wherein the color registration error correction device corrects the color registration error in the main scanning direction by using a first correction value in a case where the selection device selects the first scanning mode and corrects the color registration error in the main scanning direction by using a second correction value for correcting in opposite direction to the first correction value in a case where the selection device selects the second scanning mode.

11. An image scanning apparatus comprising:
a light source configured to illuminate a document;
a plurality of line sensors configured to receive light reflected from the document and output signals corresponding to respective color components of the received light;
a selection device configured to select one of a first scanning mode and a second scanning mode, wherein the first scanning mode allows a document to be scanned by the plurality of line sensors while the document is moved in a sub scanning direction perpendicular to a main scanning direction parallel with the plurality of line sensors and, wherein the second scanning mode allows the document to be scanned in the sub scanning direction by the plurality of line sensors while the document is stationary; and
a color registration error correction device for correcting a color registration error between the signals output from the respective line sensors,
wherein the color registration error correction device corrects the color registration error in the sub scanning direction by using a first correction value in a case where the selection device selects the first scanning mode and corrects the color registration error in the sub scanning direction by using a second correction value for correcting in opposite direction to the first correction value in a case where the selection device selects the second scanning mode.

12. An image scanning apparatus comprising:
a light source configured to illuminate a document;
a plurality of line sensors configured to receive light reflected from the document and output signals corresponding to respective color components of the received light, the plurality of line sensors including a first line sensor, a second line sensor, and a third line sensor and being disposed in parallel with each other;
a selection device configured to select one of a first scanning mode and a second scanning mode, wherein the plurality of line sensors receives light reflected from the document in the first line sensor, the second line sensor, the third line sensor order in the first scanning mode and, wherein the plurality of line sensors receives light reflected from the document in the third line sensor, the second line sensor, the first line sensor order in the second scanning mode; and
a color registration error correction device for correcting a color registration error between the signals output from the respective line sensors,
wherein the color registration error correction device corrects the color registration error in the sub scanning direction by using a first correction value in a case where the selection device selects the first scanning mode and corrects the color registration error by using a second correction value for correcting in opposite direction to the first correction value in a case where the selection device selects the second scanning mode.

13. An image scanning apparatus according to claim 1, wherein color registration error correction device corrects the color registration in the sub scanning direction, and
wherein the color registration error correction device corrects the signal of interest pixel based on the signal of the adjacent pixel in the sub scanning direction and the first correction value in a case where the selection device selects the first scanning mode and corrects the signal of interest pixel based on the signal of the adjacent pixel in the sub scanning direction and the second correction value that is different from the first correction value.

14. An image scanning apparatus according to claim 1, wherein color registration error correction device corrects the color registration in the main scanning direction, and
wherein the first and second correction values correspond to positions of the interest pixel in the main scanning direction.

* * * * *